United States Patent [19]

Loos et al.

[11] Patent Number: 4,776,137

[45] Date of Patent: Oct. 11, 1988

[54] METHOD FOR MANUFACTURING AND WORKING OF GEARS

[75] Inventors: Herbert Loos, Dorfen-Stadt; Manfred Erhardt, Puchheim, both of Fed. Rep. of Germany

[73] Assignee: Carl Hurth Maschinen- und Zahnradfabrik GmbH & Co., Munich, Fed. Rep. of Germany

[21] Appl. No.: 62,288

[22] Filed: Jun. 12, 1987

Related U.S. Application Data

[60] Division of Ser. No. 816,946, Jan. 6, 1986, Pat. No. 4,689,918, which is a continuation of Ser. No. 576,672, Feb. 3, 1984, abandoned.

[30] Foreign Application Priority Data

| Feb. 12, 1983 | [DE] | Fed. Rep. of Germany | 3304980 |
| May 17, 1983 | [DE] | Fed. Rep. of Germany | 3317915 |
| Nov. 18, 1983 | [DE] | Fed. Rep. of Germany | 3341671 |
| Nov. 19, 1983 | [DE] | Fed. Rep. of Germany | 3341877 |

[51] Int. Cl.$^4$ .............................................. B24B 1/00
[52] U.S. Cl. .................................. 51/287; 51/105 GG
[58] Field of Search .............. 29/159.2; 51/26, 105 R, 51/105 GG, 105 HB, 206 P, 287; 409/2, 3, 5, 8, 49

[56] References Cited

U.S. PATENT DOCUMENTS

| 1,884,292 | 10/1932 | Schurr ............................... 51/26 |
| 1,916,118 | 6/1933 | Robinson et al. ................... 51/26 |
| 2,147,864 | 2/1939 | Thrun ................................ 51/26 |
| 2,245,654 | 6/1941 | Drader et al. ................. 51/287 X |
| 2,351,842 | 6/1944 | Seibold ......................... 409/49 X |
| 2,996,847 | 8/1961 | Saari ............................ 51/287 X |
| 3,085,369 | 4/1963 | Findley ......................... 51/287 X |
| 4,203,258 | 5/1980 | Held ............................. 409/5 X |

FOREIGN PATENT DOCUMENTS 1161465  8/1960  Fed. Rep. of Germany.

Primary Examiner—P. W. Echols
Assistant Examiner—Andrew E. Rawlins
Attorney, Agent, or Firm—Flynn, Thiel Boutell & Tanis

[57] ABSTRACT

Apparatus for the manufacture or working of the tooth system of straight or helically toothed, externally or internally toothed gears with a hyperboloidally or globoidally or similarly formed toothed tool, which has an abrasive surface or the like, wherein a crossed-axes angle is provided. The intermeshed workpiece-tool is guided by a pair of guide wheels. The working takes place on only one flank of a tooth. The workpiece or tool spindle is coupled with a reversible motor. A brake is provided on one of the spindles. A shiftable coupling and additional brakes or centrifugal masses can furthermore be provided.

6 Claims, 18 Drawing Sheets

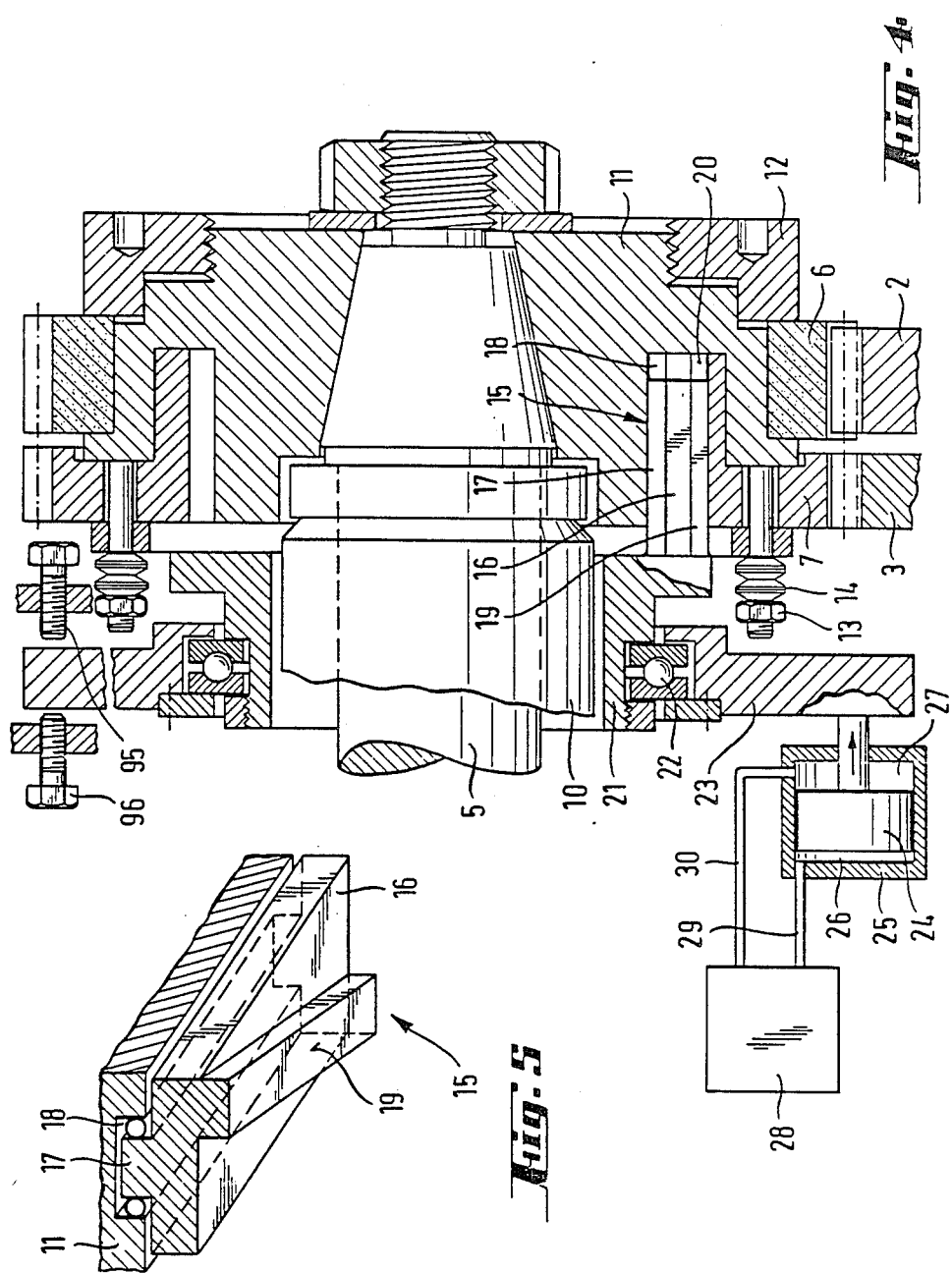

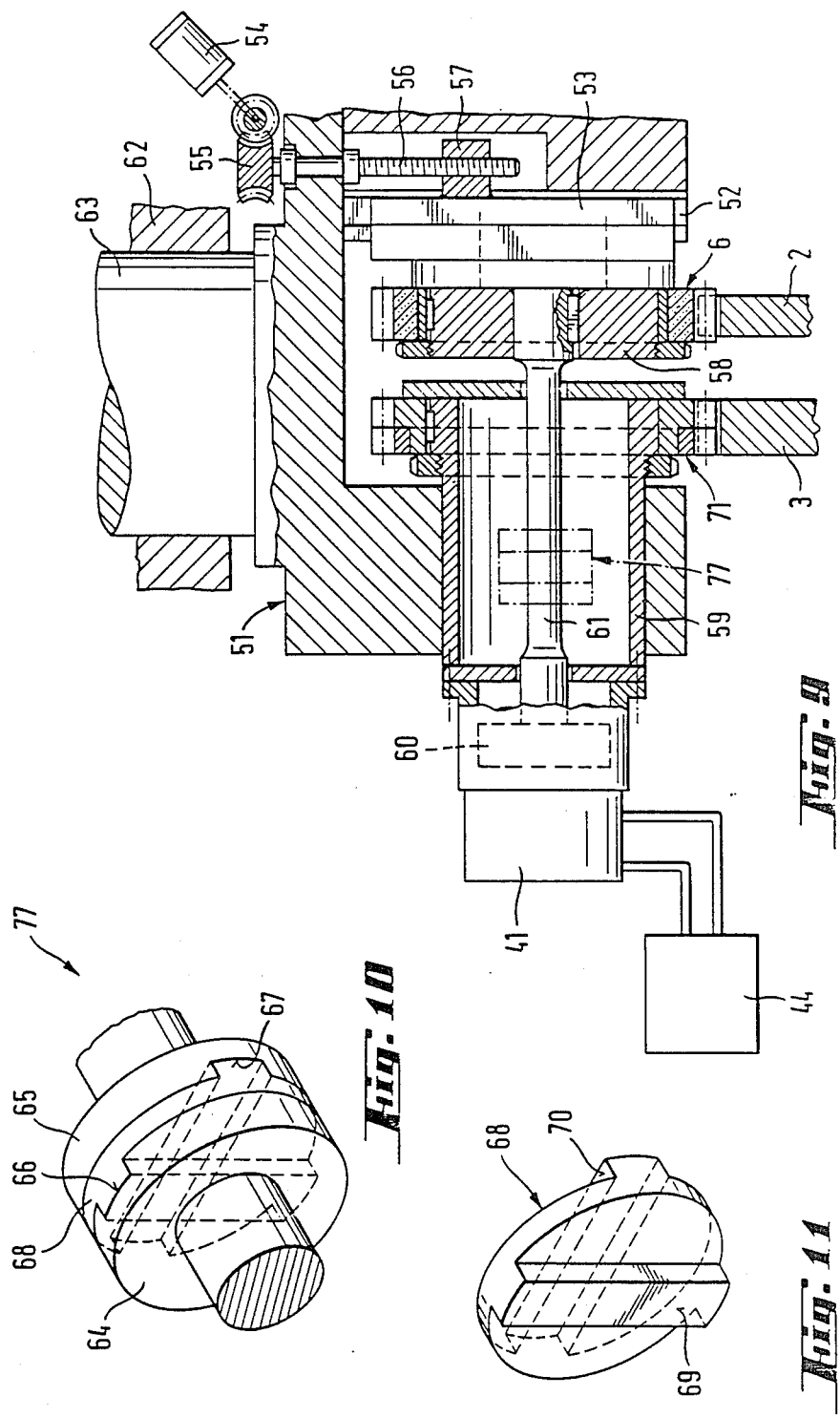

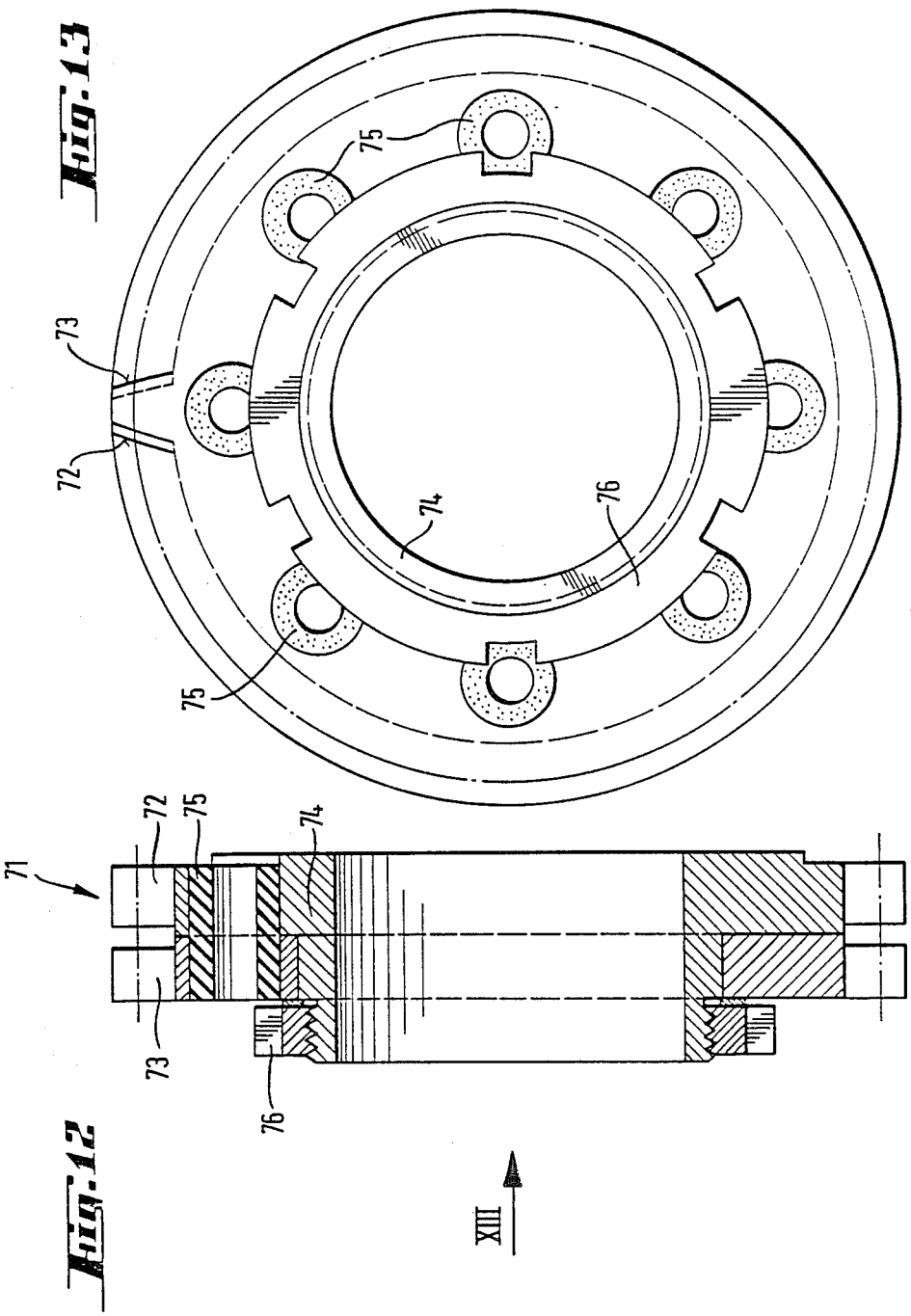

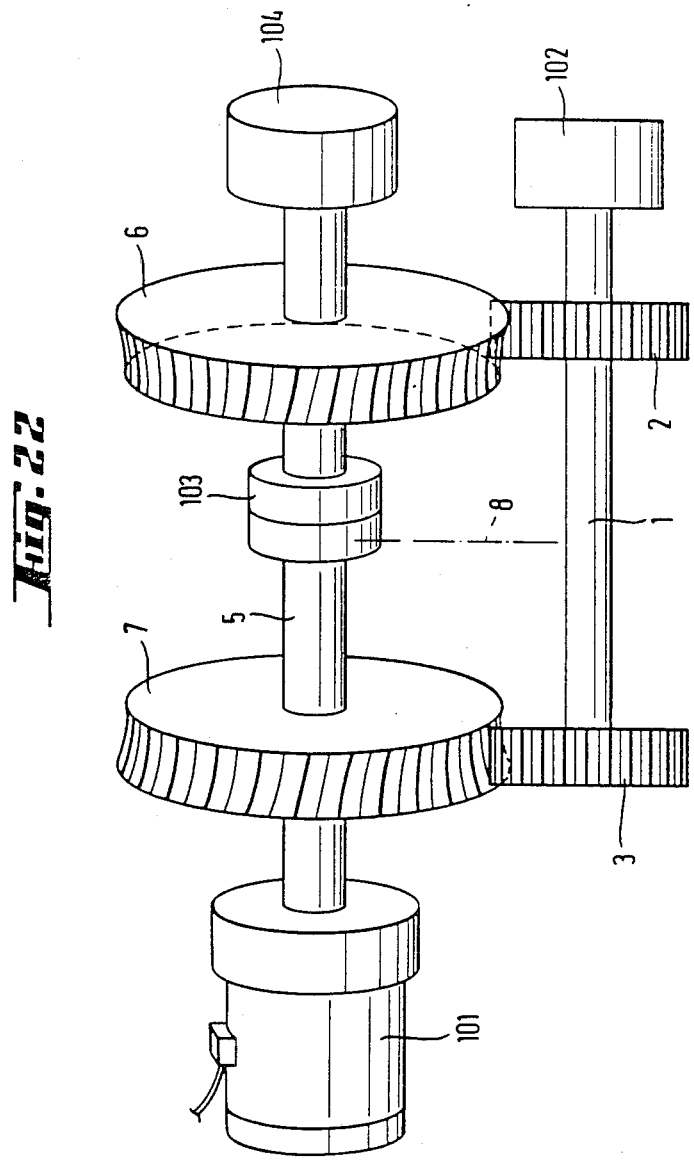

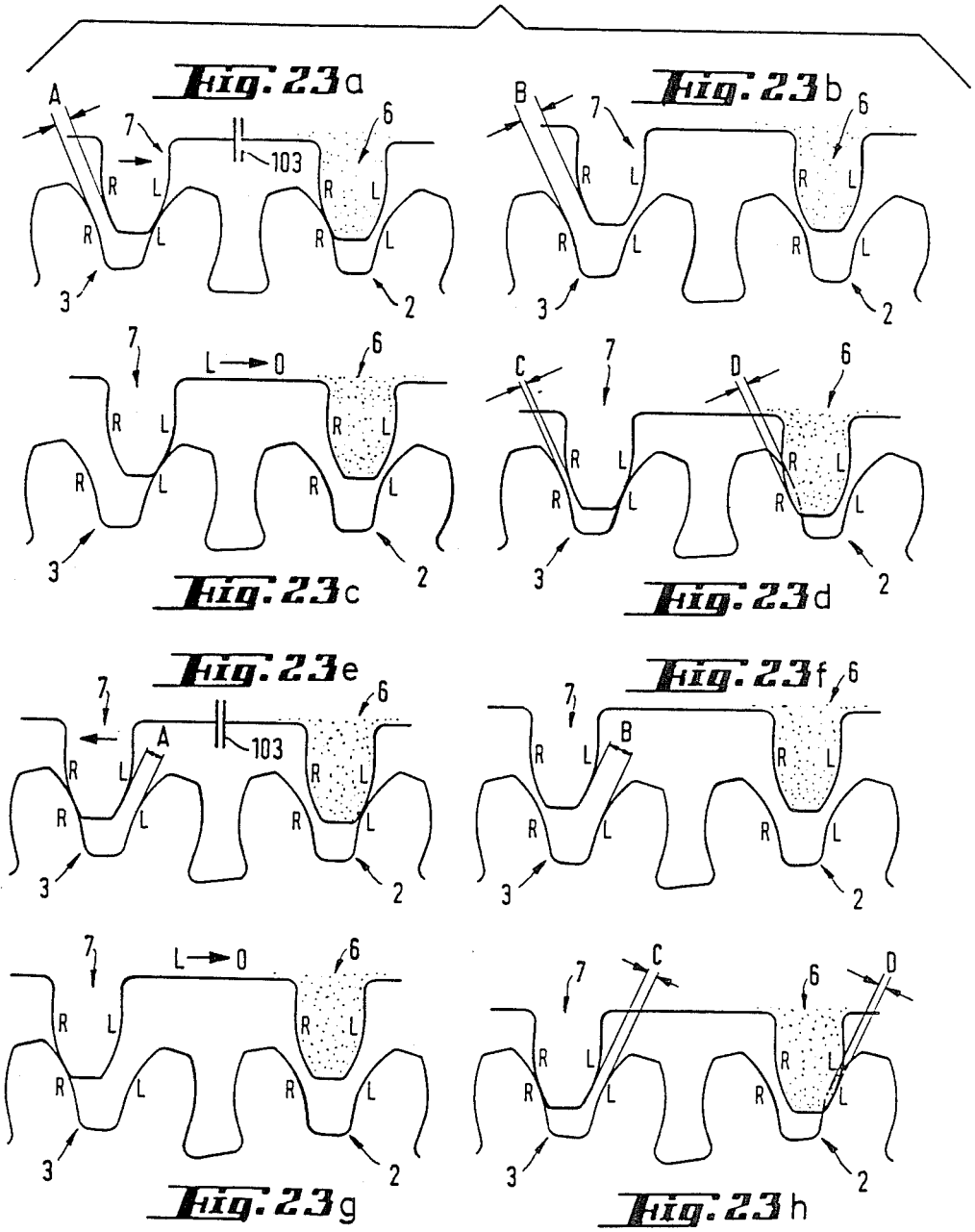

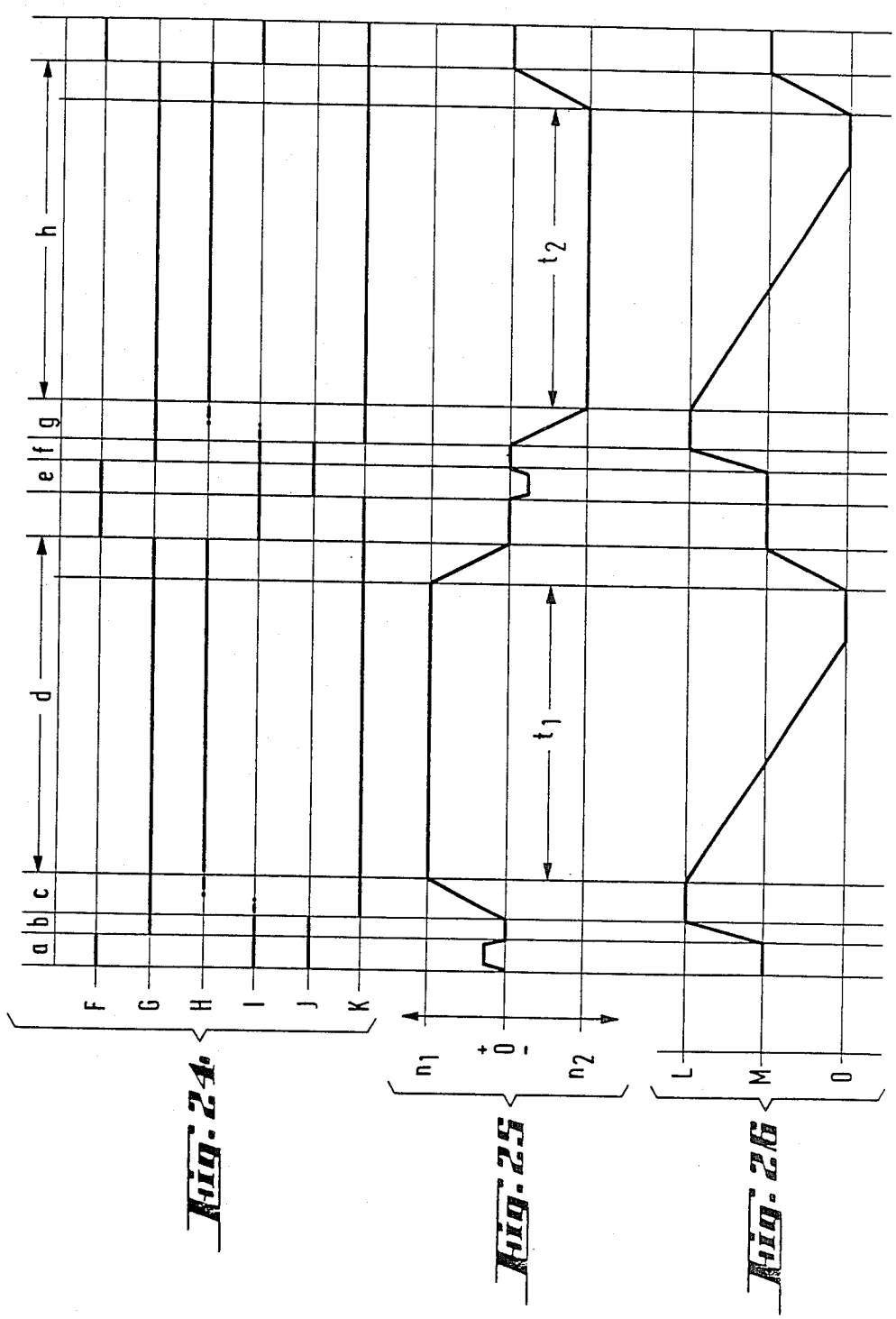

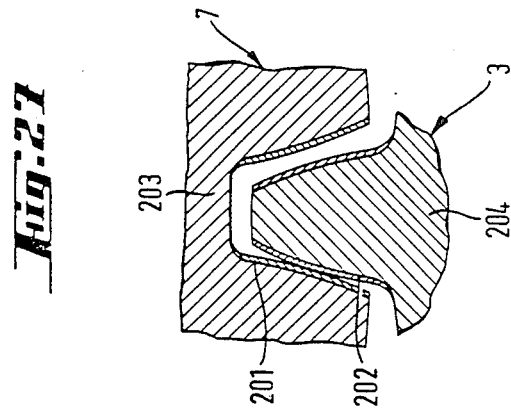
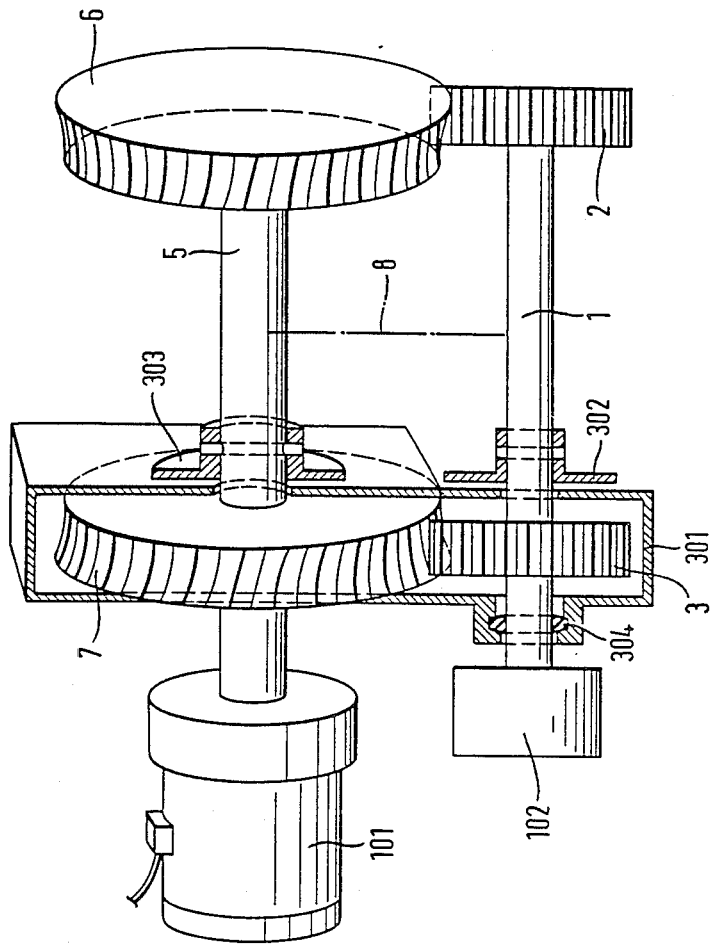

METHOD FOR MANUFACTURING AND WORKING OF GEARS

This is a continuation of application Ser. No. 816,946, filed Jan. 6, 1986, now U.S. Pat. No. 4,689,918, which was a continuation of Ser. No. 576,672, filed Feb. 3, 1984, now abandoned.

FIELD OF THE INVENTION

The invention relates to an apparatus for the manufacture and working of the tooth system of straight or helically toothed gears and to methods for manufacturing and working with the apparatus.

BACKGROUND OF THE INVENTION

An apparatus for the manufacture or working, in particular grinding, of the tooth system of spur gears is already known. This apparatus is provided with a rotating gearlike tool, which mates with the workpiece tooth system at a crossed-axes angle of larger than 35°. The tool is formed hyperboloidally or similarly and is at least as wide as the workpiece tooth system (German AS No. 25 16 059).

The basic purpose of the invention is to improve the work result of such an apparatus.

The basic purpose of the invention is attained with an apparatus utilizing a pair of guide wheels located adjacent a tool and workpiece, which guide wheels guide the tool's working of the workpiece. With the term "abrasive surface" is meant a chip-removing surface on a tool which does not have uniformly directed cutting edges or the like. This includes all tools with granular work surface, for example grinding tools, however, also includes tools for the electrolytic or electroerosive or electrochemical material removal. (For example, shaving gears do not fall within this group.)

An apparatus according to the invention operates with single-side contact, namely each tool or workpiece tooth has only one tooth flank in contacting relation during operation. This has the advantage that a cutting feed is possible, during which the center distance between the tool and the workpiece can remain the same without requiring a change of the tooth helix.

A further purpose of the invention is to prevent with certainty the wrong tooth flanks from contacting one another during the working operation.

This purpose is attained by an apparatus utilizing a braking device to retard the movement of one of the tool and workpiece relative to the driving action provided on the other of the tool and workpiece.

Various embodiments of the apparatus according to the invention are possible. For example, it is possible to use for the guide wheels friction wheels or friction disks or the like, the manufacture of which is relatively simple. One must only make sure that they have the correct speed ratio.

Another embodiment is the use of gears as guide wheels. Here too one must only make sure that the speed ratio is correct. The pitch circles of the meshed tool-workpiece and of the guide wheel pair do not need to agree; to the contrary, it can even be favorable if they are different, because then possibly pitch errors, which are caused by the apparatus, are balanced out.

If the apparatus according to the invention is used in a mass manufacture operation, it would be possible to use a first special machine for working the right flank and a second special machine for working the left flank of the workpiece teeth. Since these machines are then usually inserted into a line of machines, the total work time is not increased through this type of procedure, on the other hand the apparatus would be simple, inexpensive and not susceptible to breakdown. However, the investment costs are less as a whole if the invention includes a control device for changing the relative position of the tooth flanks on the tool and workpiece.

A further favorable development of the invention is to not only intend the engagement of the tooth system of the tool and the workpiece, but also the possibility of a one-time and step-by-step radial feeding during the actual operation. Using this procedure, it is possible to successfully do away with periodic (wave-shaped) errors of the tooth profile, which can be created in elevational direction, or those which can be created by projecting grinding granulates.

A further important development results from providing a control apparatus which enables a control of the contact pressure between the tool teeth and the workpiece teeth. This further development serves also to increase the work quality.

A favorbble development of the invention results from providing backlash between the meshed guide wheels, because cutting feed can occur without necessitating the center distance to be changed.

The invention is favorably further developed with the backlash feature mentioned above, because with this an effect can be achieved, which is similar to the so-called rigging test stand. The torsion spring offers the possibility of controlling the contact pressure of the working tooth flanks on the workpiece flanks and possibly to make the changing of the tooth flanks more gradual.

A further improvement of the workpiece quality, in particular with respect to the periodic deviations on the workpiece tooth flank, results from providing the guide wheels with different contact pitches than the tooth system of the tool.

The changing of the apparatus according to the invention is made easier by providing change gears, whereby change gears are to be understood to be such gears or friction gears which, similar to the change gears of lathes, are easily exchangeable. In this connection reference is made to the usability of the conventional quadrant.

In order to make the adjusting of the workpiece-tool tooth flanks relative to the guide wheel tooth flanks easier or in order to provide the possibility of automating this adjustment, the invention can be further developed with a drive motor coupled to the tool spindle or the workpiece spindle and a shiftable coupling provided on the spindle separate from the motor.

In order to prevent in the working method with the inventive apparatus the flank abutment from changing unintentionally, and with the provision of a shiftable clutch, the invention can be further developed by providing the spindle which is coupled with the motor with an additional brake or a centrifugal mass.

A further advantageous development is offered by coating at least one of the guide wheels with a material different from the material of the guide wheels. That is, the working surface, namely thus in friction wheels the friction surface or in gears the tooth flank or any other working surface, can be coated with a wear-resistant material, for example titanium nitride or hard chromium or the like or with a material, for example plastic, which has a good sliding characteristic. Preferably both surfaces which work on one another are coated. Advantageous is also a coating material, which is both wear-resistant and also has good sliding characteristics.

A further advantageous development is the provision of a protective device, such as a housing, which surrounds the guide wheels or a plate between the guide wheel pair and the intermeshed workpiece-tool, which plate deflects spray and chips. It may also be a combination of both.

According to a further development, the direction of rotation is changed for changing the flanks which contact each other, the relative sliding of the tooth flanks on one another in direction of the whole depth of the tooth also changes. This means, depending on which axis of the intermeshed tool-workpiece is the driving one, that the relative movement goes from the addendum to the dedendum or vice versa ("chiselling" or "drawing").

It is also possible to effect a changing of the abutting relation without a change in the direction of rotation of the drive to thereby make the working time possibly shorter, however, the work result is possibly not as good as in the case of a change in the direction of rotation. Furthermore, in this method the bending of the teeth must be considered, if high work qualities are demanded.

A further advantage of the invention is that the contact of the right and left workpiece flank with the corresponding tool flank is found quicker, securer and exacter than in conventional machines, namely independent of a changing tooth thickness of the tooth system of the workpiece and independent of the respective wear condition of the tool teeth.

The prepositioning of the workpiece tooth in relationship to the tool tooth space is simple. A prechosen amount can precisely be removed from the workpiece flank, and not time dependently. That which has been stated above is also valid for the dressing of the tool with a dressing wheel.

A particular advantage of the invention is that the amount of the work removal can be predetermined. It is no longer alone dependent on the work time. The tool is carefully treated since during starting and braking the flanks do not contact one another.

In the apparatus according to the invention, the working operation is not interrupted, therefore the pressure of the tool flank on the workpiece flank is approximately equal with the working pressure. Also during the braked or retarded working phase, the flank contact is not interrupted.

The invention operates with a so-called single-side contact. This means that in each case only the one side of the teeth are in contacting engagement. However, it is an important characteristic of the invention that the entirety of the gearing which consists of work tooth system and guide tooth system works with two-flank engagement. This means if in the work tooth system for example the right tooth side contacts, then in the guide tooth system at the corresponding tooth the left tooth side contacts or vice versa. From this results a rigid connection between the workpiece and the tool. Thus, it is prevented with certainty that the tooth flanks can lift off due to vibrations or other influences. Also through this a cutting is possible in a simple manner namely by reducing the center distance, without providing for this a special kinematics, which would be needed if the guide wheels would run without clearance. On the other hand, the single-side contact in the work tooth system assures that the flanks of the work tooth system substantially abut only on the raised flank parts and work at that location.

In the sense of the invention the term of a "motor, which can be changed for both directions of rotation" includes also an arrangement with two apparatus, of which each is specially provided for the working of only one tooth side (flank), and of which the one motor runs in the one direction of rotation and the other one in the other direction of rotation. Changing is done then by transporting the workpiece from tool to tool.

The intermeshed guide wheels should have a contact ratio which is as large as possible. The limit of the possible correction of the teeth is for this the approach of the guide wheels' teeth to become pointed at their crests.

Often on the workpieces more or less must be removed on one tooth flank than on the other. It is a particular advantage that, with the apparatus according to the invention, the material removal for each tooth side can be individually adjusted.

The invention is not to be limited to externally toothed gears, but can be applied also to internally toothed gears.

BRIEF DESCRIPTION OF THE DRAWINGS

Further advantages and characteristics of the invention will be apparent from reading the following description and inspecting the accompanying drawings, in which:

FIG. 4 illustrates an example of a tool spindle;

FIG. 5 illustrates a feed member utilized in the apparatus of FIG. 4;

FIG. 9 illustrates a further exemplary embodiment of a tool spindle;

FIG. 10 schematically illustrates a cross-keyed coupling;

FIG. 11 illustrates the cross disk for the coupling of FIG. 10;

FIG. 12 illustrates a resiliently supported guide wheel in cross section;

FIG. 13 illustrates the gear of FIG. 12 viewed in direction of the arrow XIII;

FIG. 22 illustrates an exemplary embodiment according to the invention, which is supplemented by a further brake or a centrifugal mass;

FIG. 23 illustrates the plan of an operating sequence of an apparatus according to FIG. 22;

FIG. 24 illustrates the function of the transmission elements of an apparatus according to FIG. 22 associated with the plan of FIG. 23;

FIG. 25 illustrates a diagram of a course of the speed of the motor or of the spindles, which course corresponds to the plan of FIG. 23;

FIG. 26 illustrates a diagram of the change in distance between the axes of the workpiece and the tool spindle, which change corresponds with the plan of FIG. 23;

FIG. 27 schematically illustrates the tooth engagement of the guide wheels, in which the tooth flanks are inventively coated;

FIG. 28 schematically illustrates an exemplary embodiment of the invention, in which the guide wheel pair is protected by a housing.

DETAILED DESCRIPTION

Figure 1:
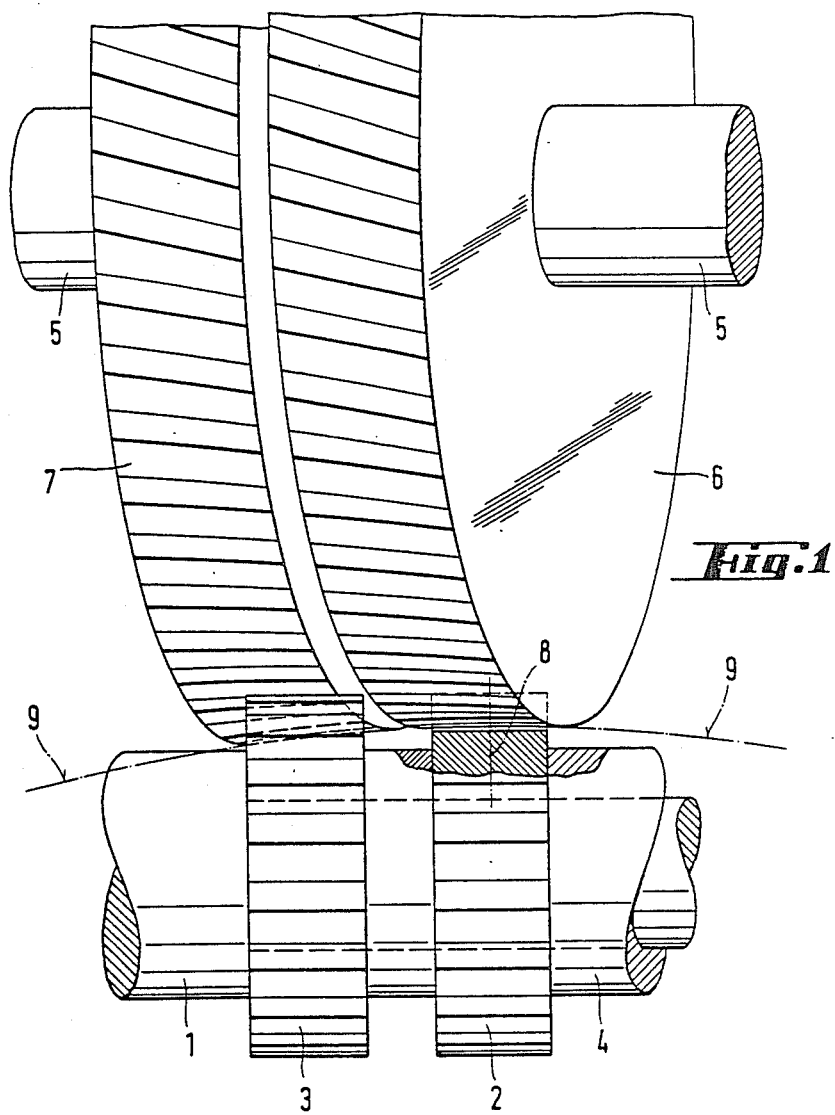
FIG. 1 illustrates schematically an exemplary embodiment of the basic form of an apparatus according to the invention.

A gear 2 (workpiece) which is to be worked and a guide wheel 3 sit side-by-side and coaxially on a workpiece spindle 1 (FIG. 1). Both are secured to the spindle 1 with a gripping device 4 which locks them against rotation and against axial movement, however, permits them to be exchanged. A toothed tool 6 and a guide wheel 7 are mounted on a spindle 5 and are fixed against rotation and axial movement relative to the spindle, however, are exchangeable with other tools and guide wheels. The tool has an abrasive work surface, thus abrasive tooth flanks, and mates with the tooth system of the workpiece 2. The guide wheel 7 is, like the guide wheel 3, a gear. Both gears 3 and 7 mate with one another. The axes of the workpiece spindle 1 and of the tool spindle 5 are crossed at a common normal distance from each other.

The so-called crossed-axes point 8 (common normal) can lie within the workpiece-tool mating area, for example in the center, or within the guide wheel mating area or in each case next thereto, for example between the said mating areas. The apparatus operates in the so-called plunge method, namely, the tool is moved along the common normal toward the workpiece. The tooth flanks of the workpiece tooth system are thusly worked, for example ground, without requiring a longitudinal or axial movement of the tool relative to the workpiece. Therefore, it is necessary that the rolling member (rolling cylinder which is expanded in the axial direction) of the tool grips hyperboloidally around the rolling member of the workpiece. Furthermore, the entire axial width or face of the workpiece must be covered by the tool tooth system. In FIG. 1 the crossed-axes point lies in the center of the workpiece tooth system, the hyperboloid 9 of the tool is thereby symmetrically illustrated.

The tooth system of the intermeshed guide wheel could actually correspond with the one of a normal and conventional gearing with crossed axes. It is advantageous and helpful to the working (performance, operating) quality of the apparatus, if they are formed hyperboloidally or similarly corresponding with the position of the crossed-axes point.

Figures 2, 3:
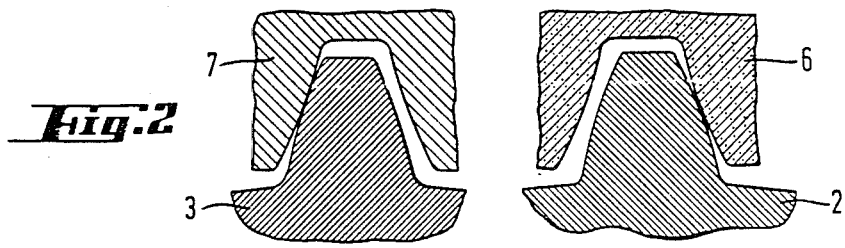
FIG. 2 illustrates in an enlarged scale a section of the tooth system of the guide wheels according to the invention.
FIG. 3 illustrates in an enlarged scale a section of the workpiece and tool tooth systems.

FIG. 2 illustrates a tooth space of the guide wheel 7 in an enlarged scale, into which space is received a tooth of the guide wheel 3. The tooth flanks abut on the left side of the space, while on the right side exists a spacing or backlash. FIG. 3 illustrates also in an enlarged scale a tooth space of the tool 6 and a tooth of the workpiece 2 received therein. Here the tooth flanks abut on the right side of the space, while on the left side exists a clearance. Thus, in the illustrated example, the right tooth flank of the workpiece 2 is worked, while the left flank of the coaxial guide wheel 3 guides and supports same. For working the other workpiece tooth flank, the relative position of the two intermeshed guide wheels is changed, thus the engaged flanks then lie on the right side in FIG. 2 and on the left side in FIG. 3. The manner in which the flanks can be changed will be described below.

FIG. 4 illustrates schematically an embodiment of the tool spindle 5. The tool spindle 5 is supported in a tool spindle head 10, of which a portion is shown. A receiving member 11 is mounted on the tool spindle and is fixed against relative rotation and relative axial movement. The toothed grinding tool 6 is supported on the receiving member. The toothed grinding wheel 6 is secured against rotation relative to the receiving member by not illustrated, conventional means and is axially tensioned by means of a clamping nut threadedly engaging an externally threaded portion on the tool spindle head 10. The tool 6 mates with the workpiece 2. The guide wheel 7 is centered in the receiving member, the teeth of which guide wheel 7 mate with the teeth on the other guide wheel 3. The guide wheel 7 can rotate in the receiving member and is held axially in place by means of a gripping device 13 (bolts, disks, nuts) and springs 14. A feed member 15 engages the receiving member 11 on the one side and the guide wheel 7 on the other side, which feed member is illustrated in greater detail in FIG. 5. The feed member consists substantially of a base member 16, a rib 17 being arranged on its upper surface, which rib is received in a groove 18 in the receiving member 11 and which extends parallel with respect to the axis of the tool 6. A wedge 19 is provided on the opposite surface of the base member 16 and is received in a corresponding groove 20 in the hub of the guide wheel 7. The longitudinal axis of the wedge is oriented at an angle with respect to the axis of the tool 6. If the feed member or base member 16 is moved axially, then the guide wheel 7 will be rotated relative to the tool 6. The relative position of the teeth (as illustrated in FIGS. 2 and 3) changes. Advantageously several such feed members are distributed around the inner surface of the guide wheel. In order to effect a moving of the feed members, a switch ring 21 is provided which is mounted in an axial bearing 22 and is secured relatively thereto against longitudinal movement. A selector fork 23 partially grips around the axial bearing. The selector fork is connected to a piston 24 through a piston rod, which piston divides an associated cylinder 25 into two chambers 26, 27. These chambers can be fed from a control apparatus 28 selectively through lines 29, 30 with a hydraulic or pneumatic pressure medium. Thus, it is possible to determine from the mentioned control apparatus the relative position of the tooth flanks of the tool and the guide wheel and thus also of the tool and the workpiece.

It can be advantageous in instances of high demand for exactness to insert between the sliding surfaces on the base member 16 and the groove 18 in the receiving member 11 plural interfering balls or rollers, which are spaced apart by a cage device.

The feed member described above is only one example. Advantageous is also the use of helically toothed, axially movable gears. The role of the bar is then taken over by the shaft of the helically toothed gear and the one of the wedge by the helical teeth.

Figure 6:
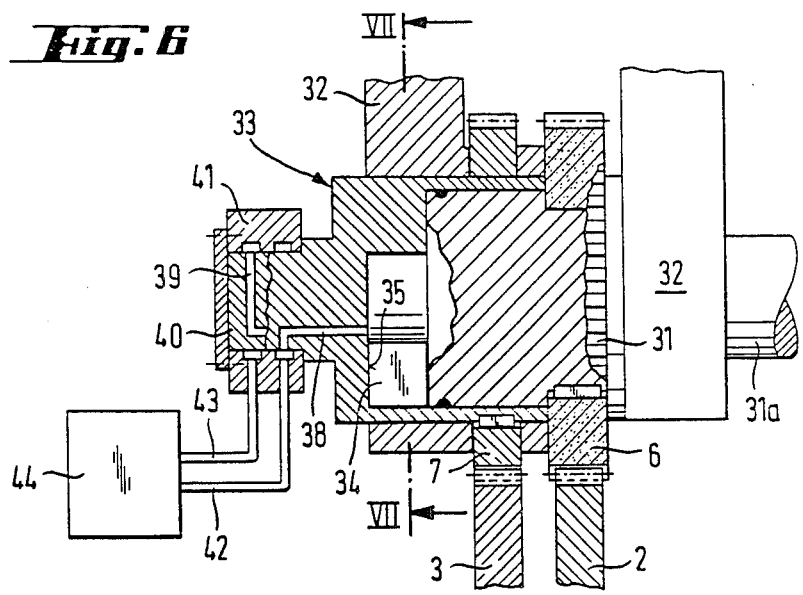
FIG. 6 illustrates a further example of a tool spindle.
Figure 7:
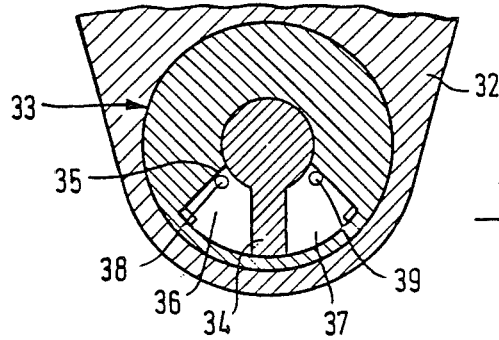
FIG. 7 is a cross-sectional view taken along the line VII—VII of FIG. 6.

FIGS. 6 and 7 illustrate an apparatus for adjusting the tooth flanks of the tool 6 and the guide wheel 7 by means of a hydraulic or pneumatic rotary piston. The tool 6 is mounted on a tool spindle 31 and is fixed against relative rotation and relative axial movement. The tool spindle 31 is supported rotatably and longitudinally nonmovably in the machine frame 32 or in a suitable carriage. The rotary drive is provided through a shaft 3a. However, it is also possible for the workpiece spindle to be drivable, which spindle is not illustrated in FIG. 6. A cylinder 33 is rotatably supported, however, longitudinally nonmovably on the tool spindle 31. The guide wheel 7 is fixedly supported against rotation and longitudinally nonmovably on the external wall of the cylinder 33. At one end the tool spindle 31 terminates in a rotary piston 34 (see also FIG. 7). In FIGS. 4 and 5, the stroke of the feed member 15 is limited by a stop mechanism 95, 96. The stop limit function can also be controlled independently within an automatic operating sequence, the means for this are actually known. However, in the embodiment of FIGS. 6 and 7, the stop limits are defined by the inner form 35 of the two chambers 36 and 37 in the cylinder 33, into which chambers open passageways 38, 39. In order to be able to supply the pressure medium to the chambers 36 and 37, the cylinder 33 is provided with a plug 40 on which, in a conventional manner, is rotatably and sealingly guided a feed sleeve 41. Fluid conveying lines 42, 43 extend from the feed sleeve to a control apparatus 44. Thus, it is possible to supply hydraulic or pneumatic medium from the control apparatus to the two chambers 36, 37 through the lines 42, 43, the feed sleeve 41 and the passageways 38, 39. In this manner, the rotary piston 34 can be driven to cause the tooth flanks to change their relative position. Also with this type of structure it is possible to control the bearing pressure of the tool flanks, because the corresponding flank of one guide wheel is supported on the other guide wheel (compare FIGS. 2 and 3). The elements like pump, filter, valves, etc. which are a part of the pressure-medium supply are not illustrated since they are known. Also the elements of the control apparatus are not illustrated, because these too are known.

Figure 8:
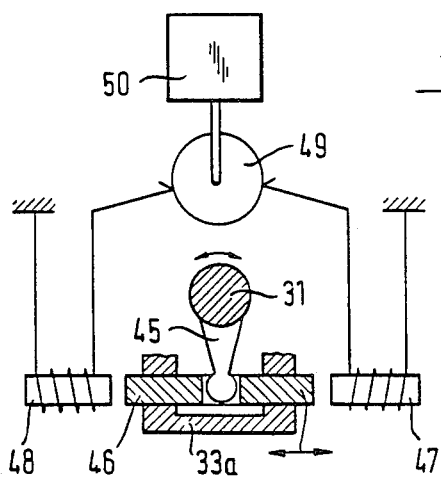
FIG. 8 schematically illustrates an electromagnetic drive for effecting an adjustment of the tool gear relative to the guide wheel.

FIG. 8 illustrates an electromagnetic drive which corresponds with the apparatus illustrated in FIGS. 6, 7. The tool spindle 31 is provided with a lever 45 instead of with a rotary piston. The lever 45 engages an armature member 46 reciprocally longitudinally guided in the cylinder 33a. Two electromagnets 47, 48, when sequentially energized, will cause the armature member to reciprocate. The electromagnets receive the sequentially applied energizing voltage through a distributor system 49, similar to the chambers in the hydraulic control, through an electrical feed sleeve, from a control apparatus 50.

FIG. 9 illustrates a tool guide wheel support for an embodiment, in which the intermeshed guide wheel engages clearance-free. A conventional carriage guide (dovetail guide or prism guide) 52 is provided in a tool carriage 51 which can be fed radially to the workpiece 2, in which carriage guide there is also radially guided to the workpiece 2 an additional carriage 53. The additional carriage can be driven by an electric motor 54 through a worm gearing 55, a feed screw 56 and a feed nut 57 mounted on the additional carriage. A tool spindle 58 is rotatably supported, however, is not longitudinally movable in the additional carriage. The tool spindle 58 receives in a conventional manner the tool 6. A guide wheel spindle 59 is rotatably supported in the tool carriage 51 approximately coaxially or axially parallel. A rotary piston system 60 is mounted on the front side on the guide wheel spindle, similar as this has been described in connection with FIGS. 6 and 7. The cylinder of the rotary piston system 60 is secured to the guide wheel spindle 59. The guide wheel spindle 59 is hollow and has a torsion spring 61 extending axially therethrough. One end of the torsion spring is secured to the tool spindle and the other end is secured to the piston of the rotary-piston system. This apparatus makes it possible to permit a shifting of the tool axis with respect to the guide wheel axis. Same is only slight, since only the radial cutting feed must be absorbed by the spring. The spring transmits the torque between the tool spindle and the guide wheel spindle and at the same time assures an elastic abutment of the tooth flanks. The radial cutting feed is controlled by means of the electric motor 54. It is also possible to provide the shaft 61 with joints.

The tool carriage 51 is supported in the machine frame or a part 62 connected thereto, by a circular or cylindrical guide 63, so as to facilitate a crossed-axes angle adjustment between the workpiece and the tool. A clamping structure is provided for locking but is not shown in the drawings.

If the torsion spring 61 is not sufficient to accommodate the radial shifting, it is possible to provide, instead, a coupling 77, which permits a parallel shifting of the shafts, for example a cross-disk coupling, as it is shown schematically in broken lines in FIG. 9 and in FIGS. 10 and 11. The coupling 77 consists substantially of two coupling halves 64 and 65, which are each provided with a front-side groove 66, 67, each extending through the center line or axis. A cross disk 68 is inserted between the coupling halves and has on opposite sides thereof a rib 69, 70. The ribs are directed perpendicularly to one another and slidingly fit into the grooves 66 and 67, respectively. Balls or rollers (not illustrated), advantageously interfering, can be inserted between the sliding surfaces on the ribs and grooves.

Since in the exemplary embodiment according to FIG. 9, the guide wheels run without backlash, one of the wheels is preferably constructed as a split resilient wheel. An example is illustrated in FIGS. 12 and 13. The gear 71 consists substantially of two halves 72, 73. One half 72 of the two halves is provided with a centering hub 74, on which the other half is rotatably supported. Both halves have identical tooth systems. At a chosen shifted displacement of the two tooth systems, axially extending aligning holes are drilled into the hub portion of each guide wheel, into which holes sleeves 75 or plugs made of an elastic material are inserted. If the halves are rotated relative to one another, in order to bring coincidence to the tooth systems, the tooth systems will be resiliently urged back into their initial position. The half which is placed onto the hub of the other guide wheel is axially held in place by a nut 76 threaded engaged on a thread provided on the hub. Many embodiments of resilient gears are known, which use as springlike members leaf or spiral springs.

Figure 14:
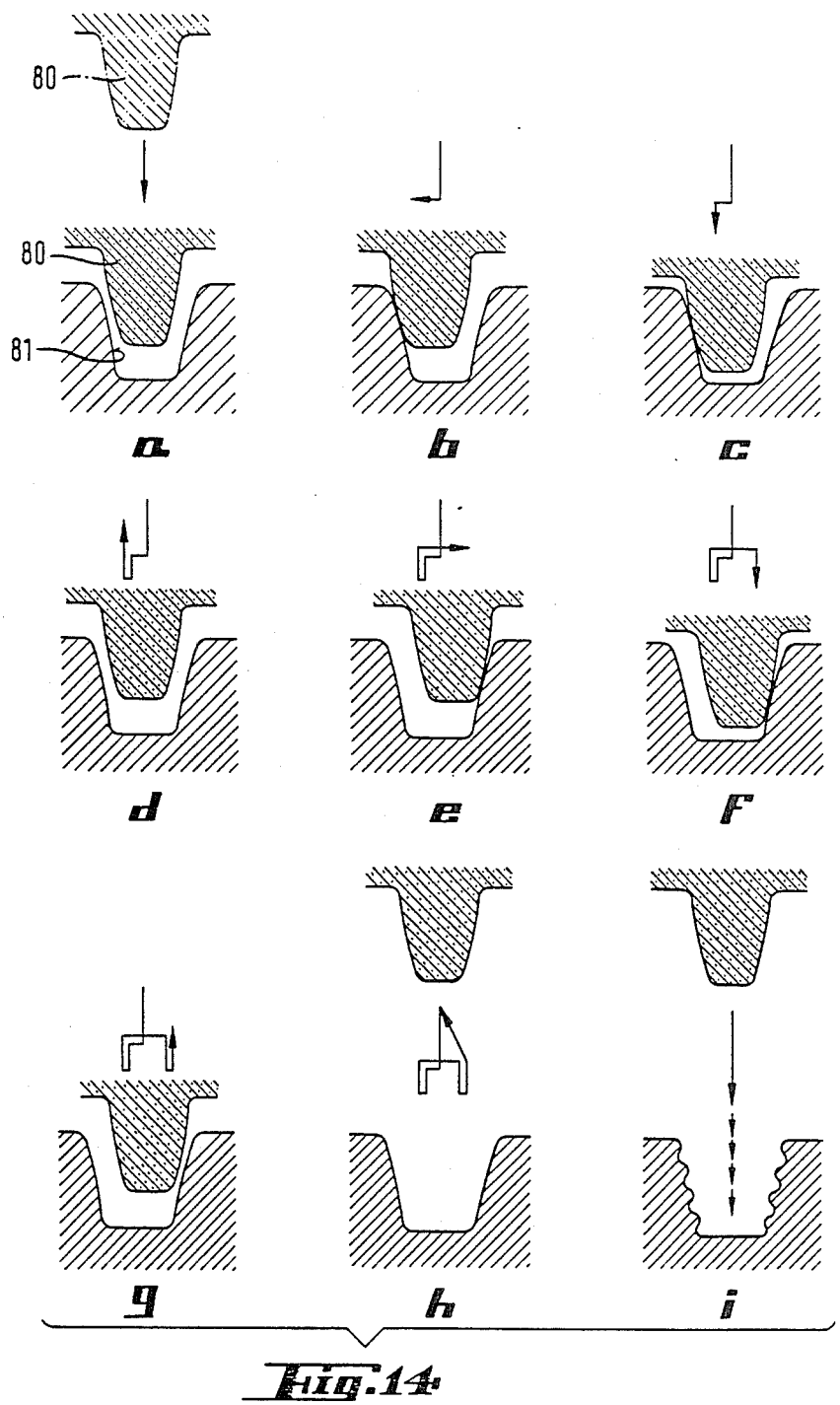
FIG. 14 schematically illustrates the sequence of operation of a method according to the invention. In place of the tooth profiles their reference profiles, namely the associated rack profile, are illustrated, which changes nothing with respect to the meaning of the illustration.
Figure 15:
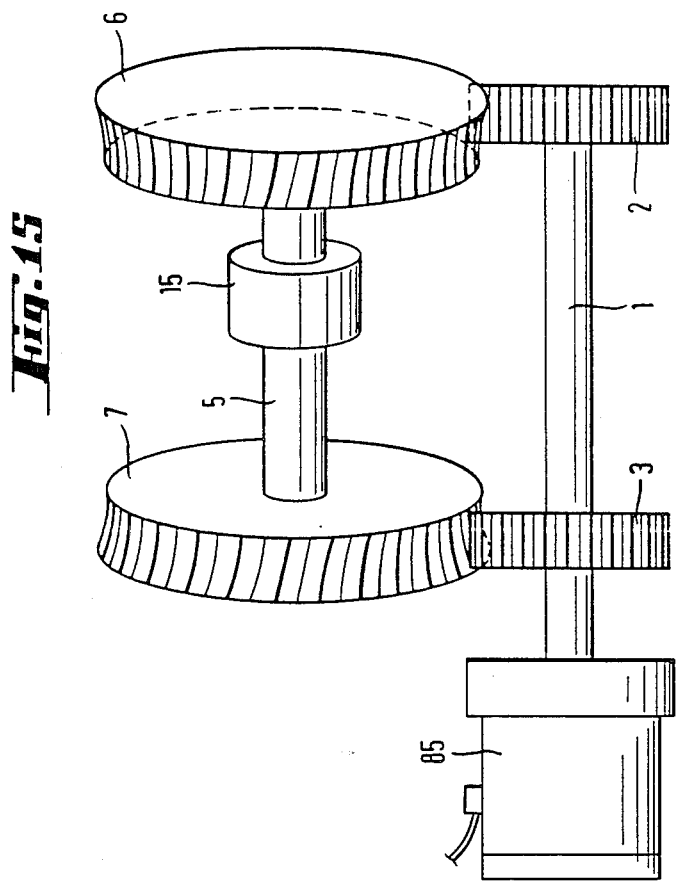
FIGS. 15 to 18 schematically illustrate some exemplary embodiments for the combination of the work gears, guide wheels, motors, couplings and brakes or centrifugal masses.

FIG. 14 illustrates schematically the sequence of operation in a method according to the invention. Reference numeral 80 identifies a tool tooth, reference numeral 81 identifies a workpiece tooth space. The method proceeds as follows (the letters below indicating the segment of FIG. 14 to be referenced):

(a) Moving or feeding the tool until the tool tooth 80 is in the initial position to accomplish an actual working with backlash in the tooth space of the workpiece or vice versa. Switching on and effecting a rotational motion of the tool and the workpiece;

(b) Laterally adjusting the relative position between the tool and the workpiece in peripheral direction until the tooth flanks contact one another; chip removal;

(c) Radial feeding; chip removal;

(d) Moving the tool and workpiece apart until approximately position a has been attained;

(e) Laterally adjusting the relative position between the tool and workpiece until contact occurs on the other workpiece tooth flank; chip removal;

(f) Radial feeding, chip removal;

(g) Moving the tool and workpiece apart in a manner set forth in d above; and (h) Returning the tool and workpiece to their initial positions and stopping the rotational motion.

The method steps b to g can be repeated or can also be combined in different ways.

The example set forth above is a relatively complicated method. It can also occur much simpler, for example using only the method steps a, b, e, h.

It is schematically illustrated in part i of FIG. 14 just how, with a repeated radial feeding, wavelike errors on the workpiece tooth flank can be overcome, in particular when the rhythm of the feeding movement corresponds with the wave length of the errors.

FIGS. 15 to 18 schematically illustrate embodiments, as they are characteristic of the invention. Elements, which are common in tool machines, have been omitted. The workpiece-tool has been identified by reference numerals 2 and 6 and the guide wheel pair has been identified by reference numerals 3 and 7 (compare FIG. 1). The axial separation between the two pairs has been exaggerated for clarity purposes and, as a result, the spindles 1 and 5 are represented as elongated shafts. A drive motor is identified by the reference numeral 85. The part 15 which is identified on the tool spindle 5 is the feed member, with which the flank contact is changed from the left to the right flank and vice versa.

Figure 16:
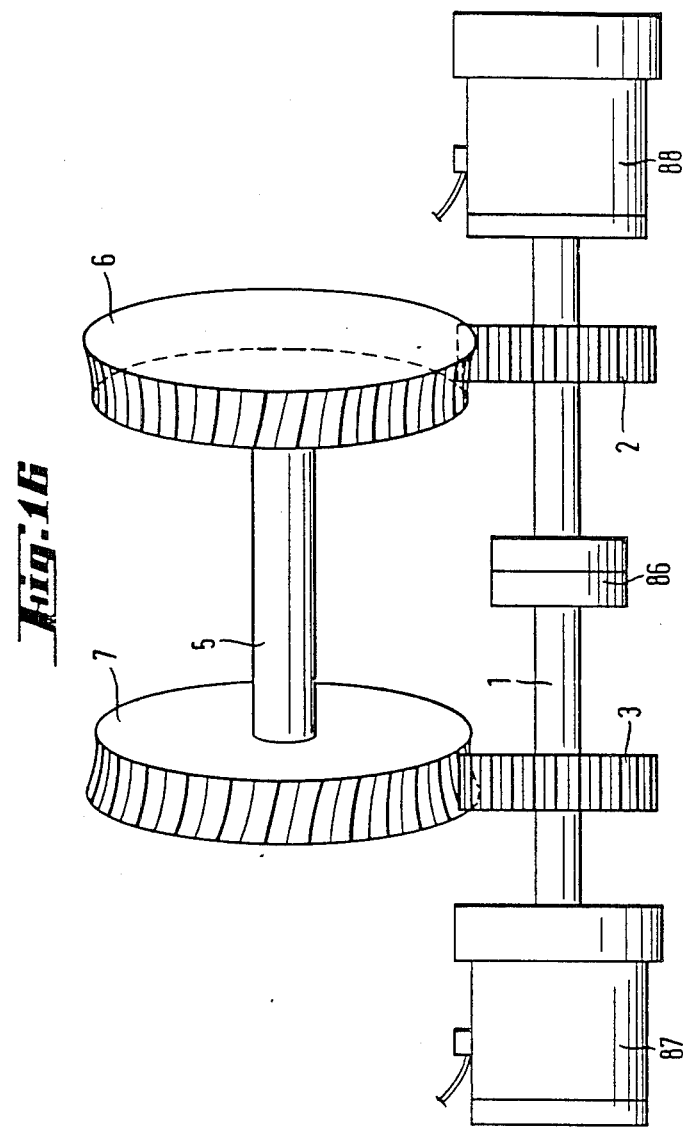

In the embodiment according to FIG. 16, the tool spindle 5 is rigid. A clutch 86 is inserted into the workpiece spindle 1. On each end of the workpiece spindle 1 and on opposite sides of the clutch 86, there is arranged a motor 87, 88, which can also be switched to braking. Based on the type of control imposed on the motor and the condition of the clutch, be it engaged or disengaged, the drivable tooth flank and because of the backlash the contacting tooth flank are changed, while being driven in the same direction of rotation, which speeds up the sequence of operation.

Figure 17:
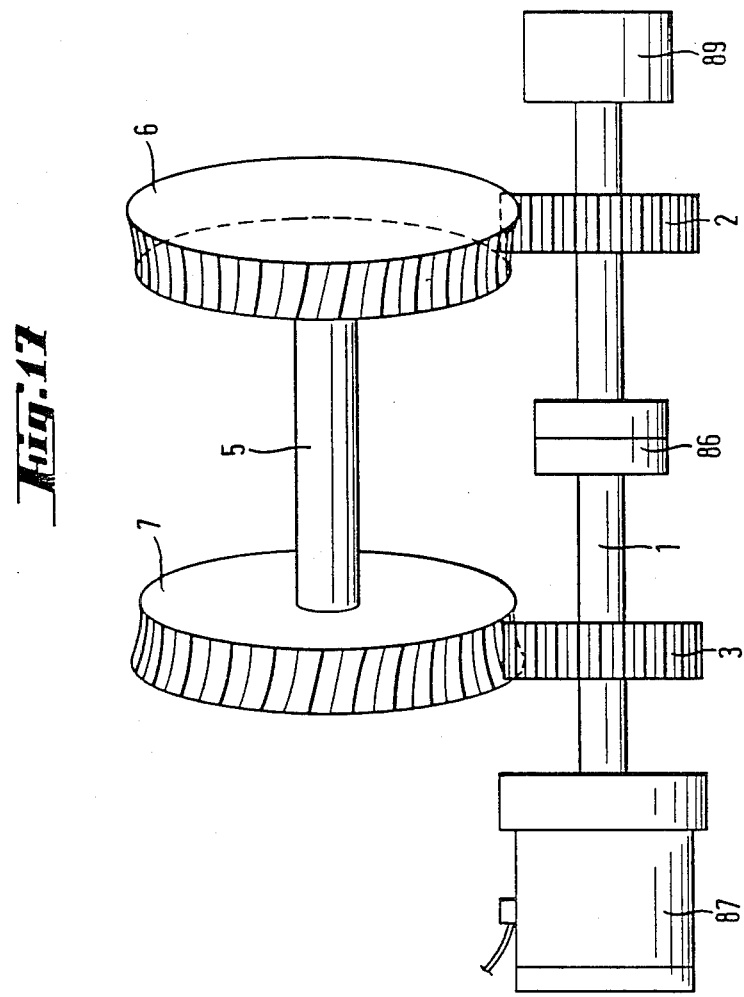

In the arrangement according to FIG. 17, the motor 87 is provided on the workpiece spindle and only on one side of the clutch 86 (left), while the other end of the spindle on the opposite side of the clutch 86 is provided with a brake or a centrifugal mass 89. The driving tooth flank and thus also the chip-removing tooth flank are changed by changing the direction of rotation of the motor and by opening and closing the clutch 86.

FIG. 17 is, like also the other figures, only to be understood schematically. For example, the clutch 86 can be arranged axially outside of the workpiece 2 and guide wheel 3. Important only is that a separation in driving relation between the workpiece 2 and guide wheel 3 can be effected.

Figure 18:
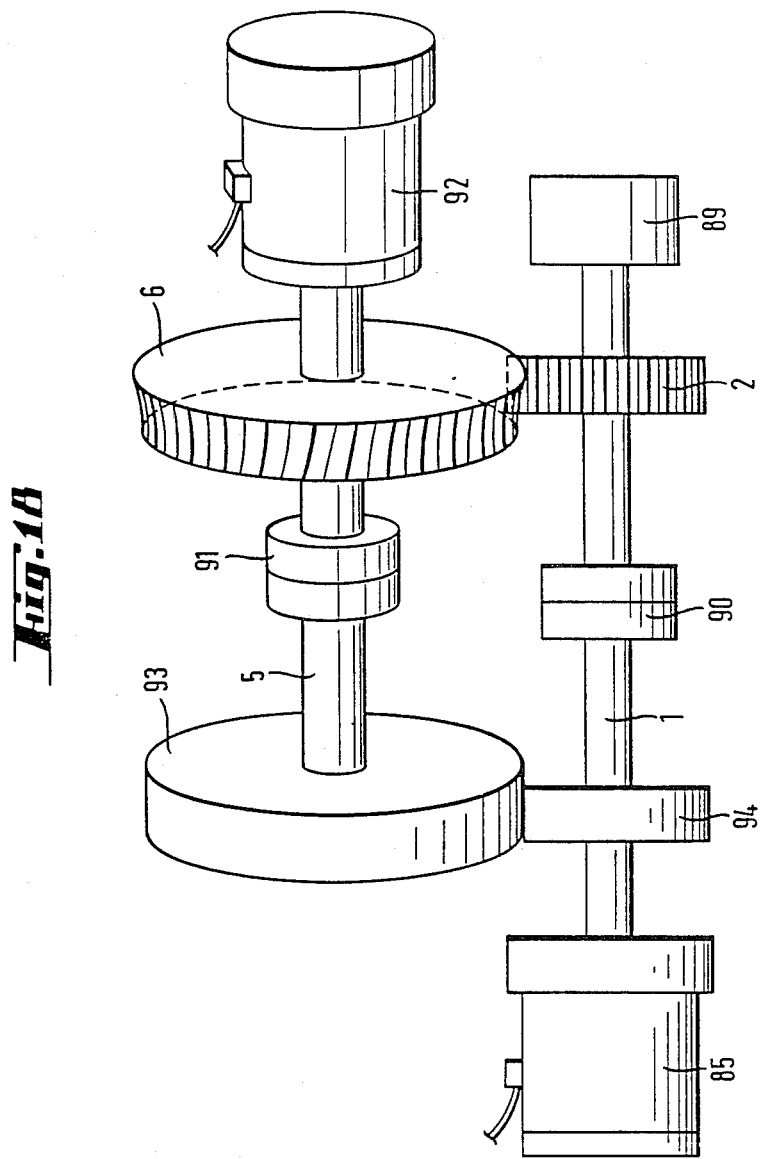

FIG. 18 illustrates an embodiment in which both spindles 1 and 5 are each provided with a clutch 90, 91. The workpiece spindle 1 is coupled on the one end (left) to a motor 85 and on the other end to a brake or centrifugal mass 89. One end of the tool spindle 5 is coupled to a motor 92. The degree of tooth flank abutment can be favorably controlled with this arrangement.

FIG. 18 also illustrates, as an example, that the guide wheels 93, 94 can be friction wheels instead of gears. The motors 85 and 92 can be electric motors or hydraulic motors.

By switching on and off or by changing the direction of rotation of the motor in FIGS. 16 to 18 and by a controlled engaging and disengaging of the clutches 86 to 91, the driving tooth flanks of the systems are changed and through this also the chip-removing tooth flanks are changed.

In a further, not illustrated embodiment it is possible to provide guide wheels which are mounted on the workpiece and tool spindle in such a manner that they do not mate. Two easily exchangeable change gears are then provided for effecting the engagement, which gears mate with one another and each with a guide wheel. A quadrant can be provided for the change gears, as it is known for example from lathes and milling machines.

Figure 19:
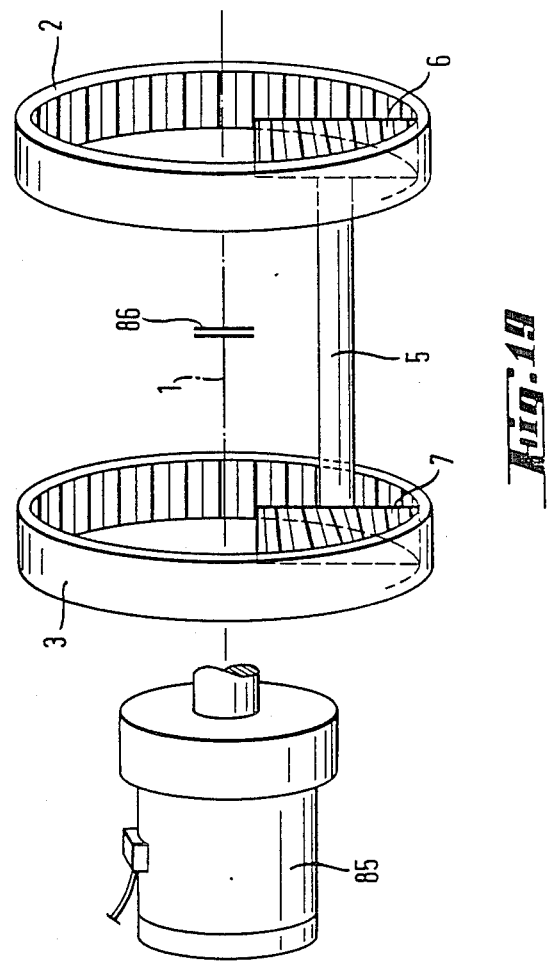
FIG. 19 illustrates the use of the invention on meshing internally toothed workpiece/tool and a meshing guide wheel workpiece.

FIG. 19 illustrates an embodiment of the invention for effecting a working of internally toothed workpieces. This principle can be applied to all other embodiments which are described and will yet be described in connection with externally toothed workpieces.

Figure 20:
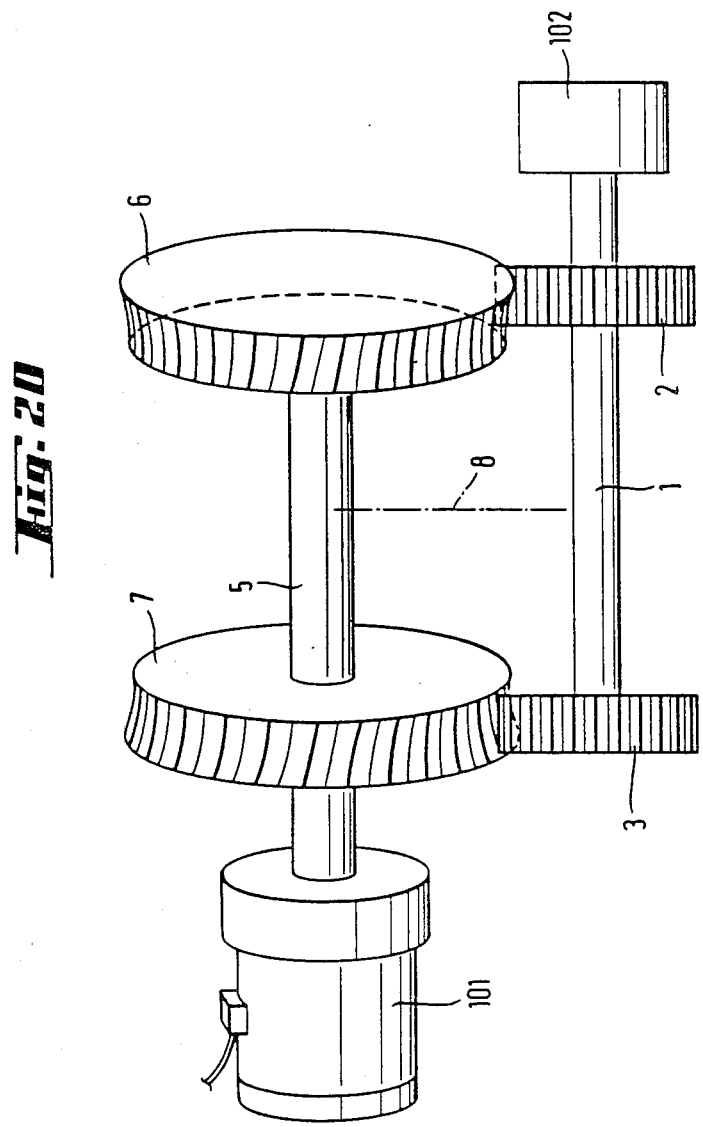
FIG. 20 schematically illustrates an exemplary embodiment with a motor arranged according to the invention.

In the embodiment according to FIG. 20, the gear 2 (workpiece) which is to be worked and the guide wheel 3 are mounted side-by-side and coaxially on the workpiece spindle 1. Both are secured or locked against rotation relative to the spindle 1 and are longitudinally nonmovable relative to the spindle 1, however, are exchangeably mounted on the workpiece spindle by a gripping device which is not illustrated. The toothed tool 6 and the guide wheel 7 are exchangeably mounted on the tool spindle and are fixed against rotation and longitudinal movement relative to the spindle 5. The tool has an abrasive work surface, thus tooth flanks, and mates with the tooth system of the workpiece 2. The guide wheel 7 is like the guide wheel 3 a gear. The axes of the workpiece spindle 1 and of the tool spindle 5 are spaced from each other and crossed. The so-called crossed-axes point 8 (common normal) can lie within the workpiece-tool pair, for example, in the center of the arrangement as shown in FIG. 20, or within the guide wheel mating area or in each case next thereto, for example between the two gear matings. The apparatus operates also in the so-called plunge method, that is, a relative movement of the tool and workpiece toward each other along the common normal.

All parts like the machine frame, carriage, feed drive, etc. which are not necessary for understanding the invention are exemplarily known from gear shaving machines and other gear precision working machines and are therefore omitted from the plan of FIG. 20. The guide wheel pair 3, 7 on the one side and the workpiece-tool pair 2, 6 on the other side have been illustrated pulled apart in an exaggerated manner for purposes of the clarity only. One of the two spindles, in the illustrated example the tool spindle 5, is coupled to a motor 101, for example an electric motor. The direction of rotation of this motor can be changed by switching the pole or by means of a gearing (not illustrated).

The spindle, which is not coupled with the motor, in the example the workpiece spindle 1, is provided with a brake 102. The brake can be switched on and off. The operation of the apparatus will be described hereinbelow but in relation to FIG. 21, next to be described.

Figure 21:
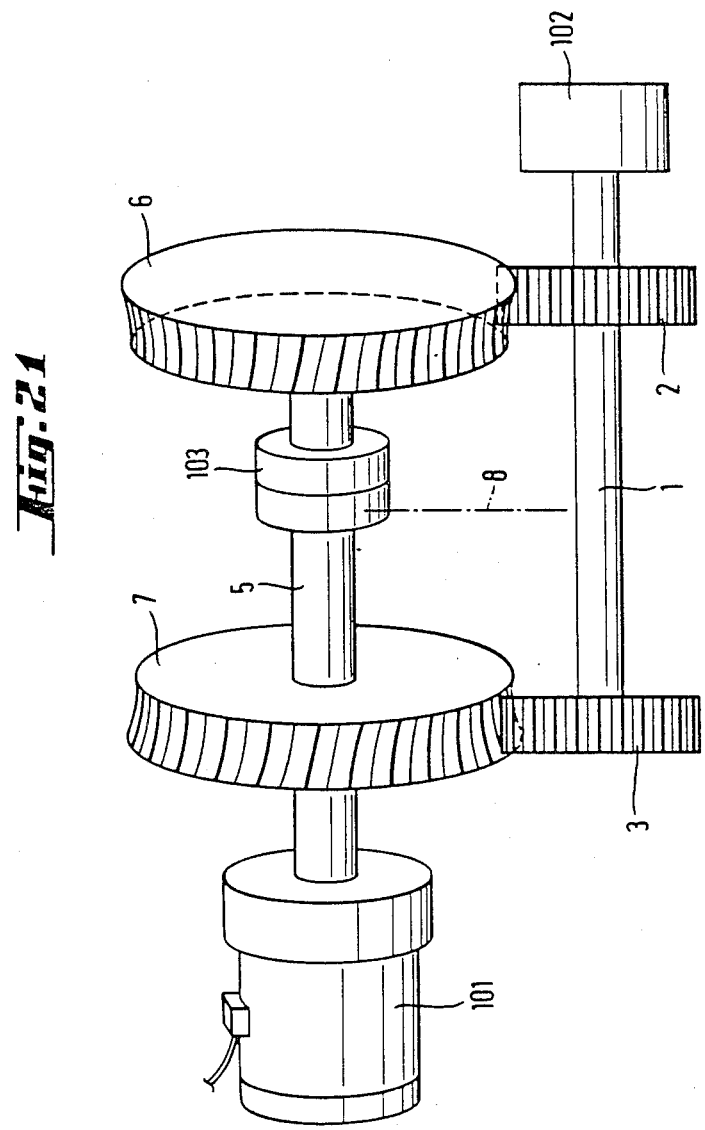
FIG. 21 illustrates an exemplary embodiment according to the invention, which is supplemented by a shiftable coupling.

In the embodiment according to FIG. 21, the spindle which is coupled with the motor 101, in the example the tool spindle 5, is additionally provided with an engageable and disengageable coupling 103 between the guide wheel 7 and the tool 6, so that the guide wheel and tool can be separated from one another during the sequence of operation.

In the embodiment according to FIG. 22, the spindle which is coupled with the motor 101, in the example the tool spindle 5, is provided with an additional brake 104 or a centrifugal mass on the end of the tool spindle 5 opposite the motor, the coupling 103 being interposed between the motor 101 and the brake 104.

The brake 102 assures that a constant contact of the flanks on the guide wheels, thus the bearing pressure on the tooth flanks will be approximately the same as the working pressure. The flank contact of the guide wheels in the working phase of braking is advantageously not interrupted. The brake 104 of the centrifugal mass has the purpose of enlarging the friction moment of the tool spindle 5 during an opened coupling 103. The apparatus according to the invention assures that the flanks of the guide wheels and of the working wheels abut (rest on) securely and without play, or with a small initial tension. The brake 104 or the centrifugal mass prevents the tool flank from giving way unintentionally.

The sequence of operation for the apparatus of FIG. 20 has not been described but, and as stated above, it can be derived from the sequence of operation for the apparatus according to FIG. 21.

FIG. 23 illustrates schematically in various phases or steps a to h the sequence of operation of a method using an apparatus according to FIG. 21. In each case, only one tooth or one tooth space of the guide wheel and workpiece which partake in the method is illustrated. The right and left tooth flanks are identified by the letters R and L, respectively. The guide wheel 3 and the workpiece 2 are mounted on a common spindle 1 and are fixedly connected to one another. A shiftable or engageable and disengageable coupling 103 is inserted into the other spindle 5 intermediate the guide wheel 7 and tool 6 (FIGS. 21, 22).

The foot portions of the teeth on the guide wheel 7 and tool 6 are connected with one another in FIG. 23. This has been done to schematically symbolize that the tool spindle 5 interconnects these two members. The two vertical dashes in this connection symbolize an opened coupling 103. If same is closed, then the parallel dashes are missing.

a. Moving the workpiece 2 into meshing relation with the tooth system of the tool 6 clamped to the workpiece spindle 1. The coupling 103 is open. The drive (motor 101) carries out a small rotary motion in any desired direction. For this example, the direction of rotation "plus" is mentioned. The left flank L of the guide wheel 7 thus drives the left flank L of the guide wheel 3. Through this the right flanks R on the meshed workpiece-tool 6, 2 engage one another, this means that the right flank R of the workpiece 2 drives the right flank of the tool 6. Brake and centrifugal mass 104 are effective. Backlash exists on the rear flank of the respective teeth, in the illustrated example, on the right flanks of the guide wheels as indicated by the reference letter A.

b. Closing the coupling 103. The center distance between the two spindles 1 and 5 is increased by a small amount, so that a possible true-running error or pitch error of the workpiece cannot have damaging effects. Specifically, this would occur if in the initial phase the smallest radius of the workpiece would accidentally hit the tool. A continued working through one half rotation would result in the largest radius hitting the tool, which could lead to a clamping. The aforementioned backlash is enlarged to B.

c. Increasing the speed of the drive to a normal operating speed and in the direction of rotation "plus". With this the left flank L of the guide wheels 3, 7 will contact. (In a special case of a large true-running error, the relationships change slightly.) An application of the brake 102 on the workpiece spindle assures a constant contact of the guide wheel tooth flanks.

d. Reducing the distance between axes. The backlash at the guide wheels is reduced to C. An amount of material removal D occurs on the workpiece. A predetermined - mostly short - time travel takes place at the smallest center distance "0". After this "refining" travelling apart to the center distance of a takes place. A backlash exists now between the right flanks of the related toolwork-piece corresponding with the removed material. The drive is turned off. The brake 102 on the workpiece spindle causes the flank contact not to change.

e. After both spindles have stopped, the coupling 103 is opened. The drive is switched on for a slow movement into a direction of rotation "minus". A condition which is opposite to phase or step a results.

f. to h. The further working corresponds to the phases b to d on the other tooth flanks.

The method can be further improved if during the opening of the coupling 103 a controllable resting moment is maintained. It is then possible at the high points of the true-running or pitch error for the guide wheels to "slide through". Work can then be done on the workpiece side with a smaller contact pressure.

The tool is honed with a dressing wheel during a sequence of operation which corresponds to the phases a to h, whereby the dressing wheel is clamped into the apparatus instead of the workpiece. The important difference lies only in that in the phases a and e, the flanks contact during an opened coupling and at a smaller distance between axes than during a sequence of operation effecting gear working.

A method can be carried out with the apparatus according to the invention also without using the shiftable coupling and without the brake or centrifugal mass 104, even if not in such an optimum manner as has been described above.

FIGS. 24 to 26 illustrate function plans of the aforedescribed sequence of operation and in regard to the phases a to h, wherein:

> L = largest center distance of the two spindles 1 and 5.
> M = center distances in phases a, e and f.
> O = smallest center distance or center distance "zero".
> F = coupling 103 open or disengaged.
> G = coupling 103 closed or engaged.
> H = brake 102 on or engaged.
> I = brake 102 off or disengaged.
> J = brake 104 on or engaged.
> K = brake 104 off or disengaged.
> $n_1$ = maximum speed in direction of rotation "positive".
> $n_2$ = maximum speed in direction of rotation "negative".
> $t_1$ = times
> $t_2$ =

In place of the brake 104, it is also possible to provide accordingly a centrifugal mass.

The thickened lines mark the function of the respective elements. The respective function is started in the region of the dashed lines.

FIGS. 23 to 26 illustrate only examples. The functions can naturally be varied depending on the concrete working tasks. In particular, it can be demanded to operate the right and left flanks differently; then the speeds, times and center distances will possibly have to be varied. The same is also true for the dressing gear. The invention provides the possibility of considering the practical experiences of operating tests in determining the final function of the apparatus. Thus, for example, in FIG. 26 the center distance change does not need to extend rectilinearly. Also the final center distance can be set several times.

FIG. 27 illustrates the tooth engagement of the guide wheels 3, 7 in a cut-out section. The tooth flanks of the teeth have a coating 201, 202 thereon, the material of which differs from the material of the base member 203, 204. If a wear-resistant surface of the teeth is desired, then it is possible to apply titanium nitride (TiN) or the teeth can be hard chromium-plated or another suitable coating can be provided. If good running characteristics are demanded, then a suitable material must be applied, for example plastic. It can also be purposeful to apply a material, which is both wear-resistant and also has good running characteristics.

FIG. 28 illustrates a development of the invention which provides that the engagement of the guide wheels 3, 7 is protected by a protective device from dirt, for example abrasive material, from the working of the workpiece 2 by the tool 6, or against sprayed fluid from the working chamber area of workpiece tool 2, 16. In the example according to FIG. 28 a housing 301 is provided for this purpose, which has the guide wheels 3, 7 mounted therein. The housing is designed such that it can easily be removed for exchanging the guide wheels. Thus, for example, a joint can be provided which extends through the axes of both spindles. The openings for the two spindles 1 and 5 are each covered by a deflector 302, 303, which are secured to the spindles. It is also possible to provide seals in place of the deflectors, as it is indicated schematically at 304 in FIG. 28 on the side of the housing remote from the workpiece 2. On the side of the housing remote from the tool 6, the opening for the tool spindle was left open in order to show a still further alternative.

Figure 29:
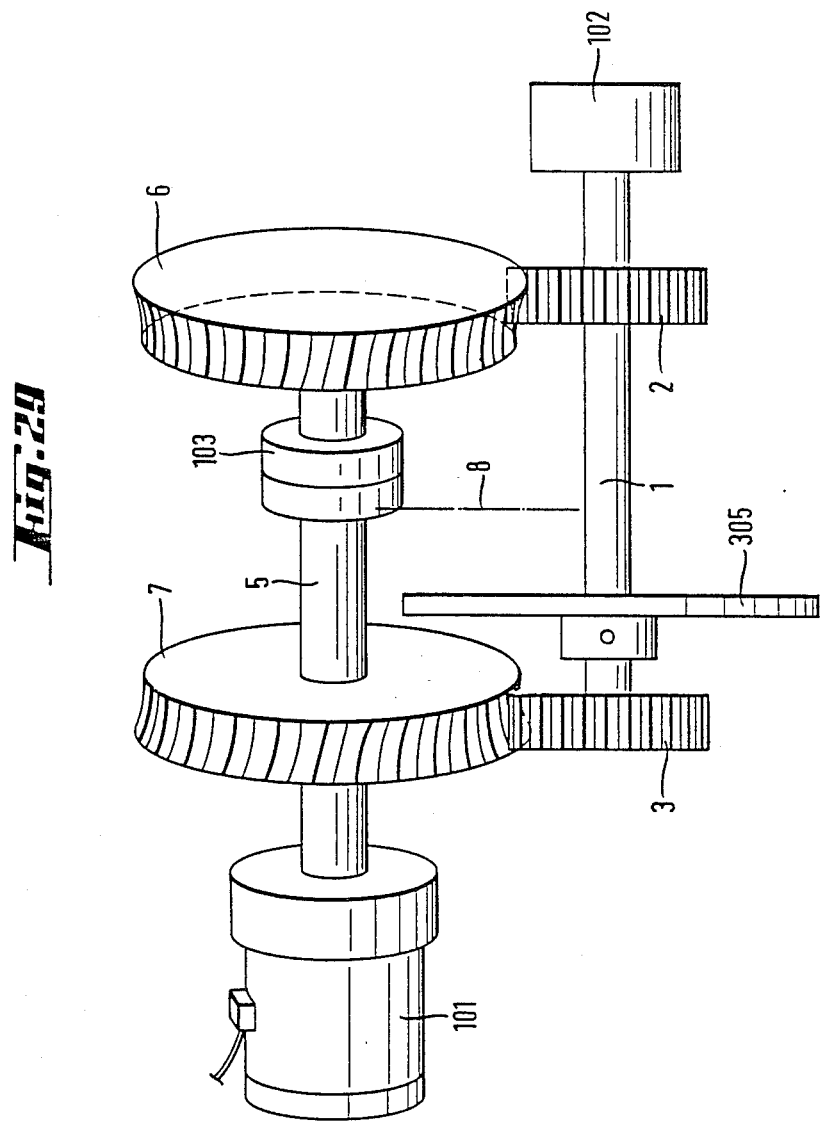
FIG. 29 schematically illustrates an exemplary embodiment, in which the engagement of the guide wheels is protected by a deflector.

Another embodiment is to leave out the housing and to cover the engaging guide wheels 3, 7 with only one or with two deflectors 305 facing toward the working chamber defined by the workpiece and tool 2, 6, which deflector or deflectors is or are secured to the workpiece spindle 1 and/or the tool spindle 5, as this is schematically indicated in FIG. 29.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for the precision working of a tooth system of a rotatably supported gearlike workpiece by rolling the teeth of said gearlike workpiece with teeth on a rotatably supported gearlike tool, the axes of rotation of said workpiece and said tool being spaced along a common normal, the steps comprising:

guiding said rotatably supported workpiece and tool for movement only toward and away from each other in a direction parallel to said common normal and so that said axes of rotation thereof are crossed;

coupling a first guide gear means in a coaxial relation to said workpiece so as to be rotatable therewith;

coupling a second guide gear means in a coaxial relation to said tool so as to be rotatable therewith;

orienting said first and second guide gear means so as to be operatively engaged with each other and having the same speed ration therebetween as between said workpiece and said tool;

controlling the relative movement between said tool and said workpiece to cause a first tooth contact to occur between successive teeth on said tool and successive teeth on said workpiece on only one side of each of said successive teeth on said tool, and to cause a first backlash spacing to occur between each of said successive teeth on said workpiece and the opposite side of each of said successive teeth on said tool;

controlling the relative movement between said first and second guide gear means to cause a second tooth contact, simultaneous with said first tooth contact, to occur between successive teeth on said first guide gear means and successive teeth on said second guide gear means on only one side of each of said successive teeth on said second guide gear means, and to cause a second backlash spacing to occur between each of said successive teeth on said first guide gear means and the opposite side of each of said successive teeth on said second guide gear means, said first tooth contact being on a first circumferentially facing side of each said successive tooth of said workpeice and said tool, said second tooth contact being on a second circumferentially facing side of each said successive tooth of said first and second guide gear means, said first circumferentially facing side facing oppositely to a facing direction of said second circumferentially facing side so that the operatively engaged combination of said workpiece/tool and said first guide gear means/second guide gear means is entirely backlash free;

driving said workpiece/tool pair and said guide gear pair for continuous rotation during an interval of time that work is being performed by said tool on said workpiece; and changing the side on which tooth contact is provided from one circumferentially facing side to the opposite side and during said continuous roational driving of said workpiece/tool pair and said guide gear pair so that said rotation of said workpiece/tool pair and said guide gear pair is continuous during a cycle of operation including a change in the side on which tooth contact is provided between said workpiece/tool pair and said guide gear pair;

whereby at least one of said teeth on said workpiece on one side thereof is engaged by at least one of said teeth on said tool as said workpiece and said tool are rotated so that abrasive means on said teeth of said tool can work on said teeth of said workpiece, and whereby the side of said teeth on said workpiece being worked can be changed to the opposite side during said continuous rotational driving of said workpiece/tool pair and said guide gear pair.

2. The method according to claim 1, wherein the engagement of the teeth of said tool and said workpiece and of the teeth of said guide gear pair occurs with backlash with a radial feed up to a center distance corresponding with the start of machining, said tool and said workpiece being rotated and turned relative to one another only then until one side of the teeth on said tool engage the opposing teeth on said workpiece to perform a machining task, thereafter said tool and said workpieces are rotated relative too one another until the other sides of the tool teeth engage the other opposing sides of the teeth on said workpiece to perform a machining task, and wherein finally said tool and said workpiece are moved radially apart and are stopped.

3. The method according to claim 1, wherein said changing step includes the step of changing the direction of rotation of workpiece and tool such that for the duration of the flank change, the connection between said workpiece and said tool and said guide gear pair is released.

4. The method according to claim 1, wherein said changing step includes the step of maintaining the same direction of rotation while changing the relative speeds of rotation of said workpiece and said tool such that for the duration of the flank change, the connection between said workpiece and said tool and said guide gear pair is released.

5. The method according to claim 1, wherein said changing step is combined with at least a radial feed of said tool relative to said workpiece.

6. The method according to claim 1, wherein during an abutment of the same side of the teeth of said tool with a corresponding side of the teeth on said workpiece, several radial feeds of said tool relative to said workpiece occur.

* * * * *